US006324265B1

United States Patent
Christie, IV et al.

(10) Patent No.: US 6,324,265 B1
(45) Date of Patent: Nov. 27, 2001

(54) ORIGINATOR DISPOSITION OPTIONS FOR COMMUNICATIONS SESSION TERMINATION

(75) Inventors: Samuel H. Christie, IV, Cary, NC (US); Greg R. Utas, Irving, TX (US); Steve J. McKinnon; David P. Ress, both of Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/100,886

(22) Filed: Jun. 22, 1998

(51) Int. Cl.$^7$ ..................................................... H04M 1/64
(52) U.S. Cl. .................................... 379/88.23; 379/88.13; 379/211.02; 379/88.17
(58) Field of Search ............................ 379/88.22, 88.23, 379/88.24, 88.25, 67.1, 201, 209, 210, 211, 212, 308, 309, 258, 265, 266, 214.01, 211.02, 88.13, 88.15, 88.17

(56) References Cited

U.S. PATENT DOCUMENTS

| | | | |
|---|---|---|---|
| 5,247,347 | 9/1993 | Litteral et al. ...................... | 379/93.12 |
| 5,327,486 * | 7/1994 | Wolff et al. ....................... | 379/93.23 |
| 5,353,283 | 10/1994 | Tsuchiya ............................ | 370/392 |
| 5,410,754 | 4/1995 | Klotzbach et al. ................. | 370/466 |
| 5,428,670 * | 6/1995 | Gregorek et al. .................. | 379/67.1 |
| 5,459,722 | 10/1995 | Sherif ................................. | 370/395 |
| 5,497,371 | 3/1996 | Ellis et al. ........................... | 370/412 |
| 5,544,229 * | 8/1996 | Creswell et al. ................. | 379/114.05 |
| 5,581,604 * | 12/1996 | Robinson et al. ................ | 379/88.13 |
| 5,594,490 | 1/1997 | Dawson et al. ..................... | 725/67 |
| 5,636,216 | 6/1997 | Fox et al. ............................. | 370/402 |
| 5,649,005 | 7/1997 | Lynch et al. ......................... | 379/242 |
| 5,675,741 | 10/1997 | Aggarwal et al. .................. | 709/242 |
| 5,873,032 * | 2/1999 | Cox et al. ............................. | 455/414 |
| 6,014,439 * | 1/2000 | Walker et al. ....................... | 379/266 |
| 6,055,305 * | 4/2000 | Norman et al. ................. | 379/211.01 |
| 6,069,890 * | 5/2000 | White et al. .......................... | 370/352 |
| 6,104,786 * | 8/2000 | Gibilisco et al. ................. | 379/88.23 |
| 6,104,789 * | 8/2000 | Lund ................................. | 379/93.23 |

OTHER PUBLICATIONS

International Telecommunications Union, Telecommunication Standardization Sector (ITU–T) Recommendation Q.931 bis: Digital Subscriber Signalling System No. 1 (ITU 1995).
ITU–T Recommendation Q.931: Digital Subscriber Signalling System No. 1; Network Layer (ITU 1994).
ITU–T Recommendation Q.932: Digital Subscriber Signalling System No. 1; Network Layer (ITU 1994).
Java™ Remote Method Invocation Specification, Sun Microsystems, Inc. (Oct. 1997).
Nortel TSAPI Service Provider document.
Nortel MDC Library document: CompuCall Base.
Nortell MDC Library document: Enhanced Call Processing for Functional Signalling.
CompuCall Specification (DMS–100; CompuCall/Meridian SCAI Interface Specification, Release 06.0 (Sep. 1997).
Economic FAQs About the Internet, Jeffrey K. MacKie–Mason and Hal R. Varian, Jun. 1995.

(List continued on next page.)

*Primary Examiner*—Fan Tsang
*Assistant Examiner*—Ovidio Escalante

(57) ABSTRACT

An apparatus for providing a calling party with options for call termination treatments. The apparatus allows the called party to provide options which are presented to the calling party for a treatment when an attempted communications session is not successfully completed, and it provides the calling party with the selected treatment. Various types of treatments include receiving a recorded message, transferring to a voice mail system, transferring to a pager, or initiating another communications session.

28 Claims, 6 Drawing Sheets

OTHER PUBLICATIONS

H.323: Multimedia Conferencing for Packet Switched Networks, David Lindbergh, Picture Tel Corporation.
DMS Meridian Digital Centrex document.
Norstar Unlimited document: Voice Mail Systems.
Norstar Unlimited document: NT Norstar Product Description.
NBTEL Net Meeting 2.0 document.
Microsoft Net Meeting 2.0 document.
MDC Library document: ISDN Basic Rate Interface (BRI).
Unified Messaging: The VPIM Initiative (Abstract), Bernard M. Elliot, 1995–97.
Voice Profile for Internet Mail, G. Vaudreuil, Feb. 1996.
Voice Profile for Internet Mail, The Voice Profile for Internet Mail (VPIM) Work Group.

* cited by examiner

ORIGINATOR DISPOSITION OPTIONS FOR COMMUNICATIONS SESSION TERMINATION

REFERENCE TO RELATED APPLICATIONS

The present application is related to the following applications, all of which are incorporated herein by reference: application of Samuel H. Christie, IV, Ser. No. 09/109,885 filed on even date herewith and entitled "Messages for Sending Real-Time Information in a Communications Network"; application of Samuel H. Christie, IV, Ser. No. 09/100,887 filed on even date herewith and entitled "Distributed Treatments on Hold for Communications Networks"; and application of Samuel H. Christie, IV, Ser. No. 09/102,016 filed on even date herewith and entitled "Treatments in a Distributed Communications System."

FIELD OF THE INVENTION

The present invention relates to an apparatus and method for providing a calling party with options for termination treatments.

BACKGROUND OF THE INVENTION

Interactive communication systems provide certain options for users. For example, phones are typically interfaced with voice mail systems, permitting a calling party to leave a voice mail message for the called party or to be transferred to an operator or other person. Also, when a phone caller or session originator does not successfully complete a call, the communications device may provide a message concerning why the connection was not made, such as a disconnected number. Other options exist for treatments during the course of a communications session. For example, while placed on hold, a communications device may provide the caller on hold with prerecorded music.

The versatility of these communication systems, however, is limited in certain respects. For example, when a calling party provides a voice mail message, the communications device and corresponding voice mail system typically records the message in real-time, maintaining a connection and thus potentially creating increased use of the network as well as increased expense of the call.

Other limitations exist. For example, when a person is placed on hold, he or she may hear prerecorded music without having any options in terms of the type of music or treatment received. During the period of the held call, valuable network bandwidth is wasted. In addition, when calling parties unsuccessfully complete a call, they typically have an option of leaving a voice mail message or transferring to an operator but do not have any additional options or cannot determine the treatment that they receive.

Accordingly, a need exists for increased options for various treatments in communications systems.

SUMMARY OF THE INVENTION

An apparatus consistent with the present invention attempts to initiate a communications session from a calling party's communications device to a called party's communications device. It receives at the calling party's communications device a plurality of options for treatments if the attempted communications session was not completed. The apparatus receives an indication of a selected one of the treatments and provides the selected treatment.

Another apparatus consistent with the present invention receives an attempt to initiate a communications session from a calling party's communications device to a called party's communications device. It provides to the calling party's communications device a plurality of options for treatments if the attempted communications session was not completed.

A method consistent with the present invention attempts to initiate a communications session from a calling party's communications device to a called party's communications device. It receives at the calling party's communications device a plurality of options for treatments if the attempted communications session was not completed. The method receives an indication of a selected one of the treatments and provides the selected treatment.

Another method consistent with the present invention receives an attempt to initiate a communications session from a calling party's communications device to a called party's communications device. It provides to the calling party's communications device a plurality of options for treatments if the attempted communications session was not completed.

DETAILED DESCRIPTION

Apparatus and methods described below involve processing between two or more communications devices, typically a calling party's communications device and a called party's communications device. The various types of processing increase the versatility of a communications session or attempted communications session by providing certain features and options to the calling party or the called party, or other parties to the communications session. The processing and connection, or attempted connection, between the calling party's communications device and the called party's communications device, or other parties to a communications session, may occur through any type of communications network.

Communications Network

Figure 1A:
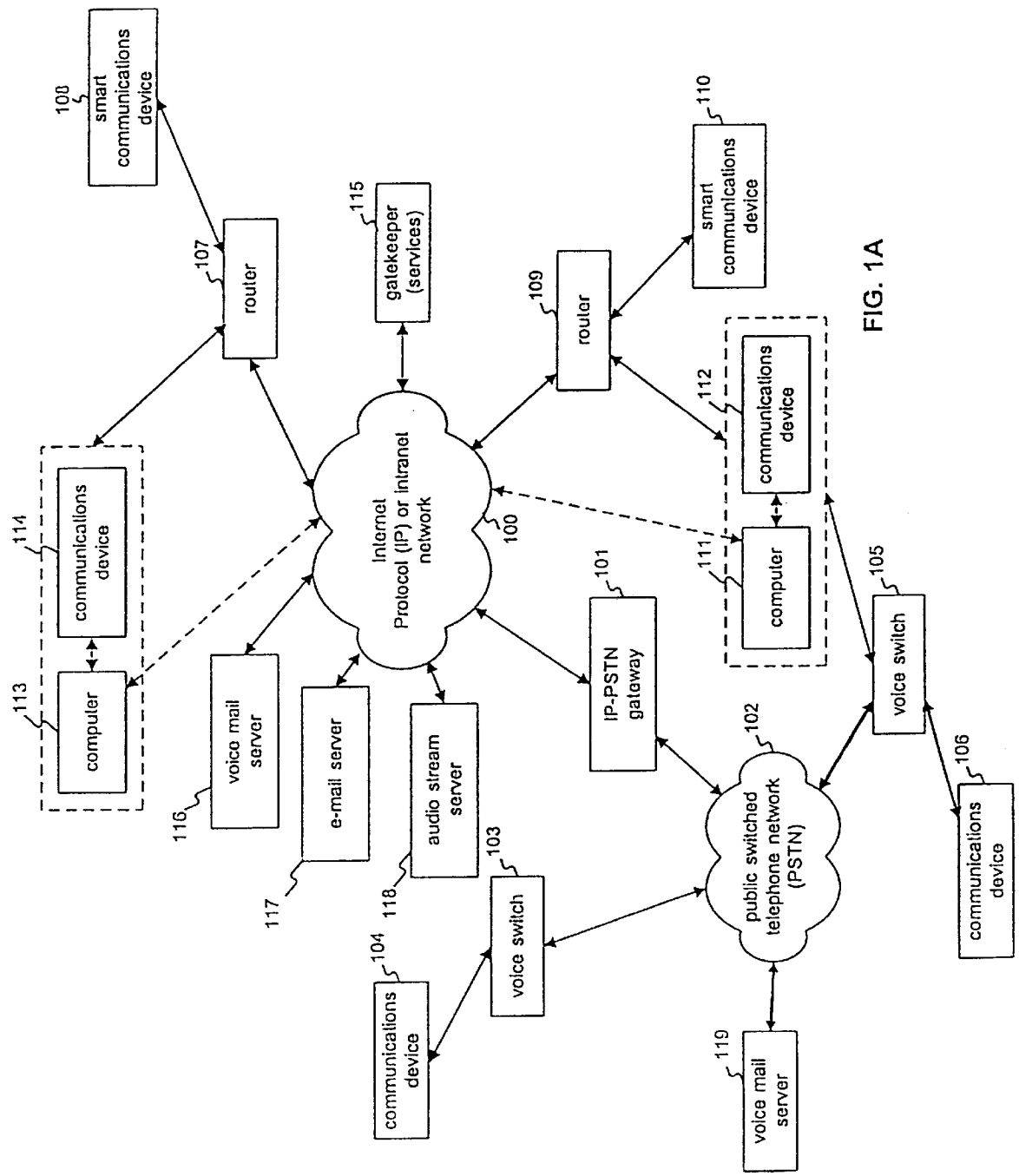
FIG. 1A is a block diagram of an exemplary communications network.

FIG. 1A is an example of a communications network. It includes an Internet protocol (IP) or intranet network 100 interfaced with other devices. IP network 100 may represent, for example, communications through the Internet using various known protocols. Gateway 101 is interfaced between IP network 100 and a public switched telecommunications network (PSTN) 102. PSTN 102 is further interfaced with voice switches 103 and 105 connected to communications devices 104 and 106. Thus, communications devices 104 and 106 may communicate through PSTN 102 with other communications devices interfaced with PSTN 102, or they may communicate with other communications devices interfaced through IP network 100. Although the switches are shown interfacing network 100, the switches may alternatively be considered to be contained within that network.

In addition to communications devices interfaced through a PSTN, communications devices may interface directly with IP network 100. A smart communications device 108 interfaces through a router 107 to IP network 100. Likewise, a smart communications device 110 interfaces through a router 109 to IP network 100. Smart communications devices 108 and 110 include their own processor for providing functions necessary to interface with a router. Although the routers are shown interfacing network 100, the routers may alternatively be contained within that network.

The network may also include communications devices with associated computers, such as those present on a desktop. Such computers may include associated display devices or presenting information and input devices for entering information. A communications device 114 and associated computer 113 interface with router 107, and a communications device 112 and associated computer 111 interface with both router 109 and voice switch 105. Thus, computer and communications device combinations may operate through IP network 100, PSTN 102, or both. The word "communications device" is intended to encompass any device for electronically transmitting voice or other real-time information. Examples of communications devices include, but are not limited to, the following: a phone plus a switch for performing processing for the phone; a phone plus an associated computer for possibly performing processing for the phone; a smart phone or smart communications device as identified above; and a cellular phone plus associated switch or other equipment for performing processing for the phone. A communications device may also include or have access to a local cache for caching of information in order to avoid, for example, having to repeatedly retrieve the same information from a network.

IP network 100 includes a voice mail server 116 for processing voice mail for communications devices interfaced with the network. Likewise, PSTN 102 includes a voice mail server 119 for processing voice mail for communications devices interfaced with that network. A voice mail server may be connected to both network 100 and PSTN 102. IP network 100 may also include an electronic mail (e-mail) server 117 for processing e-mail or other messages. Examples of messages include, but are not limited to, e-mail, voice mail, text, audio or visual information, multimedia information, or programming information. A media stream server 118 provides multimedia connections through IP network 100 to various sources. A gatekeeper 115 provides and controls services through the network such as call waiting. Other devices may interface IP network 100, such as a device for transmitting video information. Communications devices are thus media independent and may typically process a variety of information such as, for example, voice, multimedia, video, and control or programming signals.

The following are examples of products for implementing various components shown in FIG. 1A. Voice switches include the DMS-100™ product by Northern Telecom, Inc. Routers include the Cisco 3600 product. Gatekeepers and IP-PSTN gateways include those roducts meeting the International Telecommunication Union (ITU) H.323 standard. Voice mail servers include the Meridian® Mail product by Northern Telecom, Inc. E-mail servers are known and include various applications for computers. An example of an audio stream server for providing audio over the Internet is the RealAudio product by RealNetworks, Inc. An example of a product that provides video and audio conferencing over the Internet is the Microsoft NetMeeting product by Microsoft Corporation.

An example of an IP for voice mail systems to send messages over the Internet is known as Voice Profile for Internet Mail (VPIM) and is described in the following document, which is incorporated herein by reference: G. Vaudreuil, "Voice Profile for Internet Mail," Octel Network Services, Network Working Group, Request for Comments: 1911, Category: Experimental (Feb. 1996).

Figure 1B:
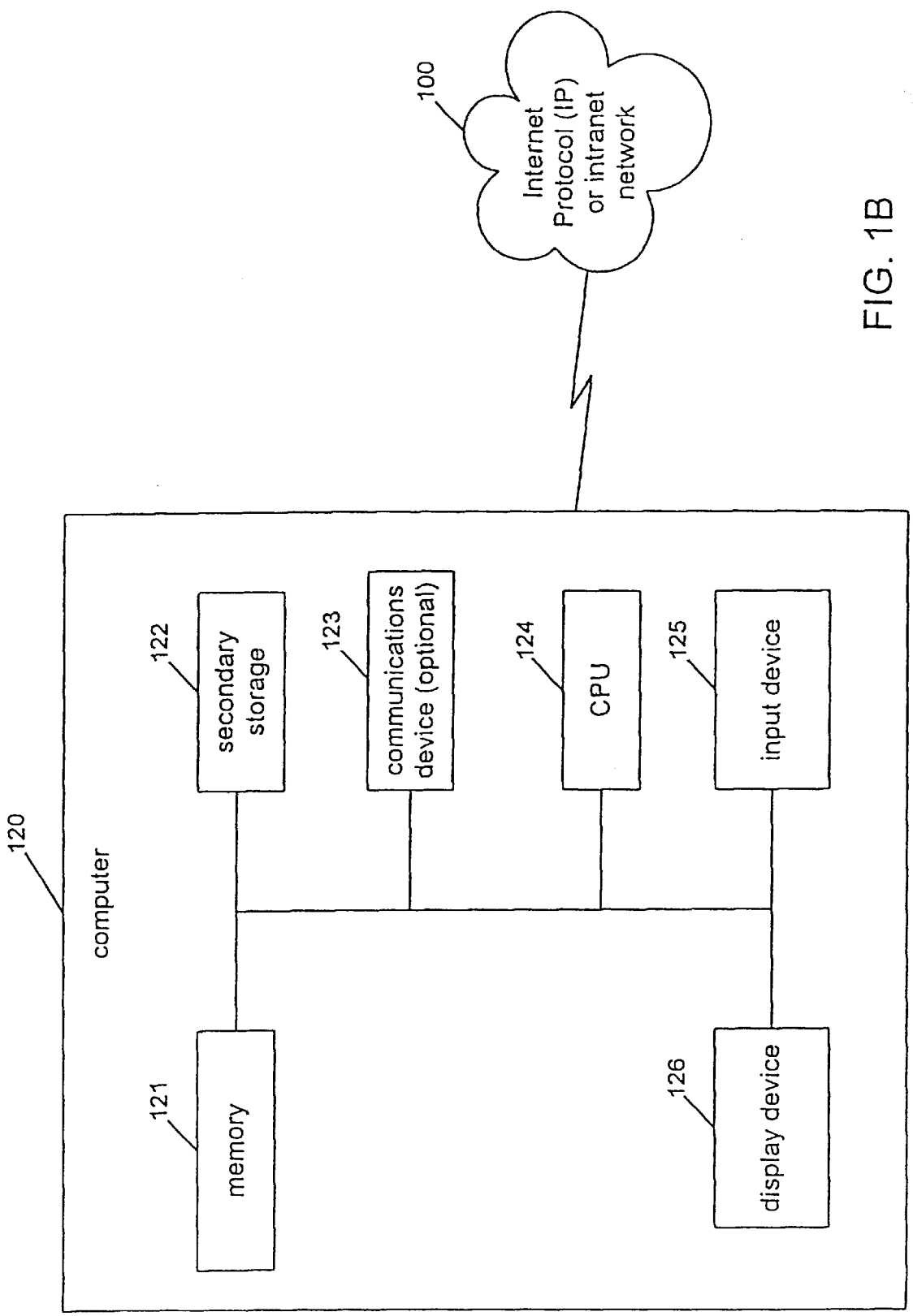
FIG. 1B depicts an example of computers shown in FIG. 1A.

FIG. 1B depicts a computer 120 suitable for practicing methods and systems consistent with the present invention. Computer 120 may correspond to computers 111 or 113, and it may be connected to Internet Protocol or intranet network 100. Computer 120 typically includes a memory 121, a secondary storage device 122, an optional communications device 123, a central processing unit (CPU) 124, an input device 125, and a display device 126. Memory 121 may include random access memory (RAM) or similar types of memory. Secondary storage device 122 may include a hard disk drive, floppy disk drive, CD-ROM drive, or other types of non-volatile data storage. CPU 124 may include a processor for executing programs stored in memory 121 or secondary storage 122, or received from the Internet or other network 100. Input device 125 may include any device for entering information into computer 120, such as a keyboard, cursor-control device, or touch-screen. Display device 126 may include any type of device for presenting visual information such as, for example, a computer monitor or flat-screen display. Communications device 123 may include the examples of communications devices provided above. As shown in FIGS. 1A and 1B, a computer optionally may include a communications device or be associated with a communications device.

Although computer 120 is depicted with various components, one skilled in the art will appreciate that this computer can contain additional or different components. In addition, although aspects of an implementation consistent with the present invention are described as being stored in memory, one skilled in the art will appreciate that these aspects an also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling a computer system, such as computer 120, to perform a particular method.

Sending Real-time Information in Communications Networks

From the perspective of a calling party's communications device, an apparatus for sending indications of messages to a called party may include the following elements. The apparatus attempts a connection from a calling party's communications device to a called party's communications device and receives from the called party's communications device an indication that the attempted connection was not completed, potentially including instructions to leave a message. The apparatus records real-time information and sends to the called party's communications device a message providing an indication of the real-time information.

From the perspective of a called party's communications device, an apparatus for receiving indications of messages from a calling party may include the following elements. The apparatus receives an attempted connection from a calling party's communications device to a called party's communications device and provides to the calling party's communications device an indication that the attempted connection was not completed. The apparatus receives from the calling party's communications device a message providing an indication of real-time information related to the attempted connection.

An apparatus associated with the calling party's or called party's communications device may include additional features, such as the following. The connection with the calling party's communications device may be disconnected before the calling party or other person records the real-time information. The real-time information may be received or provided with the message or, alternatively, an address for accessing the real-time information may be received or provided. In addition, receipt notification may be provided concerning whether the transmitted real-time information was received or accessed at the called party's communication device. The real-time information may also be transmitted securely to prevent unauthorized access to it.

Figure 2:
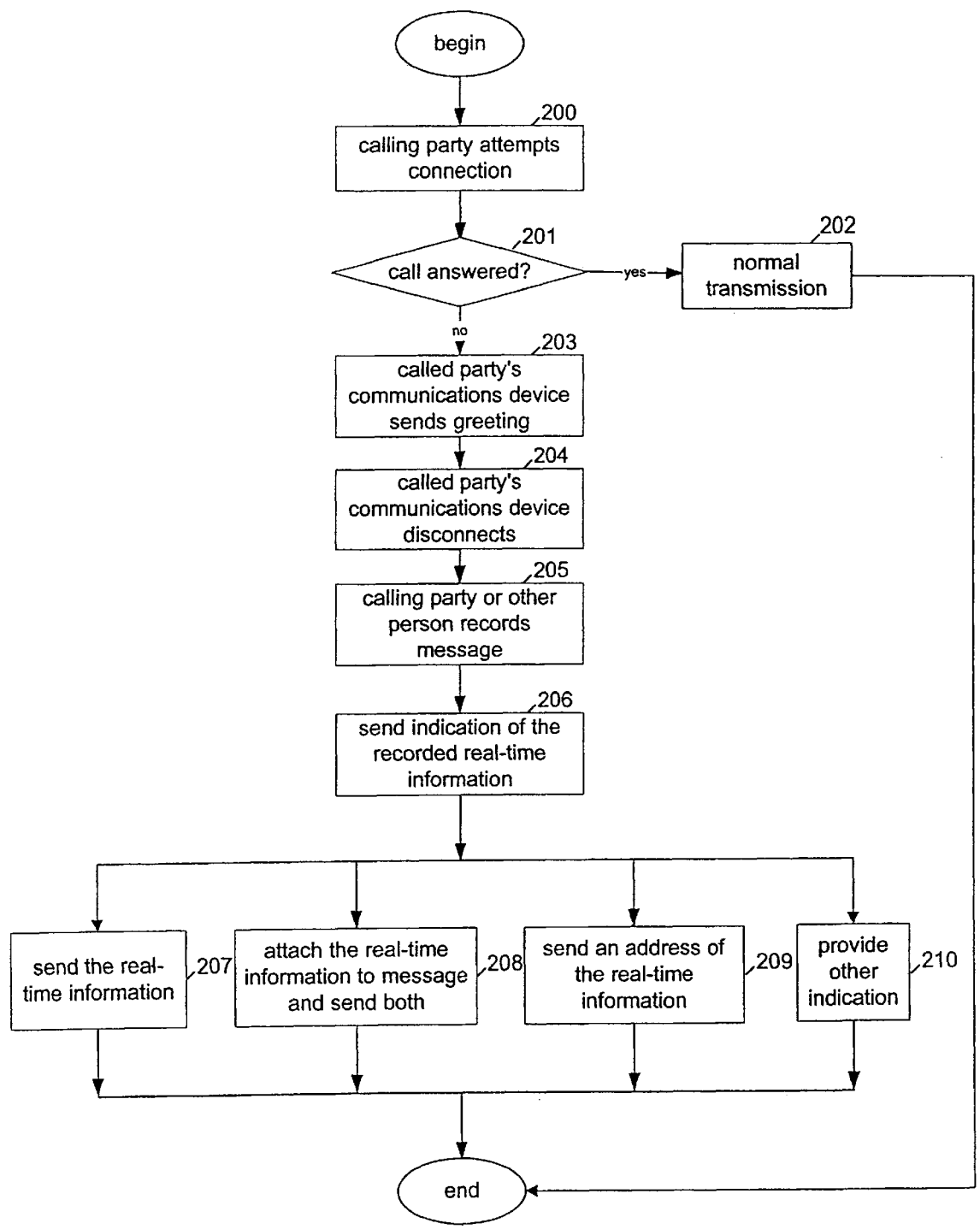
FIG. 2 is a flow chart of a process for sending real-time information in a communications network.

FIG. 2 is a flow chart illustrating this process for sending real-time information in a communications network. A calling party attempts a communications session or connection (step 200). If the call is answered (step 201), normal transmission occurs (step 202) involving a real-time communications session. Otherwise, the called party's communications device may provide, and the calling party's communications device may receive, an indication that the attempted connection or communications session was not completed or was unanswered. An attempted connection or communications session may be not completed or unanswered, as identified in FIGS. 2, 4, and 5, if, for example, the line is busy, no one answers the call, someone other than the intended recipient answers the call, or a voice mail or messaging system answers the call.

If a connection is not made, the called party's communications device may send a greeting to the calling party (step 203). This greeting may include a typical voice mail-type greeting, instructing the calling party to leave a message. After sending the greeting, the calling party's communications device or, alternatively, the called party's communications device, disconnects the connection (step 204), saving network connection time and potentially reducing fees if the system includes different fees for sending packets over the Internet, or other network, or at a lower priority.

The calling party or other person then records a message (step 205). The word "message" is intended to encompass any information such as, for example, voice or other audio, video, facsimile information or other data, control signals, or Java applets (programming information). Java applets are known and are described in, for example, the following document, which is incorporated herein by reference: Jamie Jaworski, "Java 1.1 Developer's Guide, Second Edition," pp. 330–342, 750–754, Sams.net Publishing, 1997.

An indication of the real-time information is sent to the called party's communication device (step 206). For example, the calling party's communications device may send the real-time information using, for example, VPIM identified above (step 207), it may attach the real-time information to a message, for example, a Multipurpose Internet Mail Extensions (MIME) e-mail attachment, and send both (step 208), or it may send a network address and protocol, for example, a universal resource locator (URL), identifying a location of the real-time information (step 209). As mentioned above, communications devices may include associated computers, and those computers may receive and process the messages such as, for example, e-mail messages. Java URLs are known in the art and an explanation appears in, for example, the following document, which is incorporated herein by reference: Mary Campione & Kathy Walrath, "The Java™ Tutorial: Object-Oriented Programming for the Internet," pp. 494–507, Addison-Wesley, 1996.

Optionally, a signal may be sent to the called party's communications device to provide an indication of the real-time information or message, and this indication may include, for example, a flashing light or initial stutter dial tone (step 210). This signal may be provided by a server for the called communications device.

With respect to FIG. 1A, the processing shown in FIG. 2 may occur between communications devices in PSTN 102, communications devices in IP network 100, or between a communications device in PSTN 102 and another in IP network 100 or other network. When the called party's communications device sends the greeting (step 203), the communications device may access a corresponding voice mail server which provides the recorded message. If the interface is through PSTN 102, for example, voice mail server 119 may provide a corresponding recorded message. If the connection is through IP network 100, voice mail server 116 may provide the message. Alternatively, the communications device itself, such as smart communications device 110, may provide the greeting. If a voice mail server provides the greeting, either party's communications device or corresponding serving switch may disconnect the connection with the calling party's communications device after the server provides the greeting; in other words, after step 203. Therefore, the calling party may record a message after disconnection from the called party's communications device. Accordingly, although the real-time information is recorded in real-time, the information need not be transmitted in real-time, which provides an advantage of, for example, sending the information at a lower priority or using a lower cost communications path.

This disconnection feature reduces the time of the connection, potentially reducing the cost of the call and the network connection time required to record and send a message. This early disconnection thus saves network time and potentially fees in a network using packet-based transmission of information. Typically, different fee structures exist for different types of transmission of packets over IP network 100 or other communications network. After the calling party records a message, the calling party's communications device may transmit the message or an indication of the message via packets having a reduced level of service and corresponding reduced fee, as it need not be transmitted in real-time to the called party's communications device. Transmission of information over a network using packets and varying pricing for the transmission are known and are described in, for example, the following document, which is incorporated herein by reference: Jeffrey K. MacKie-Mason & Hal R. Varian, "Economic FAQs About the Internet," Computer Based Learning Unit, University of Leeds (June 1995).

The processing shown in FIG. 2 may be implemented in software for controlling the corresponding communications device. If the connection involves a communications device interfaced with PSTN 102, the corresponding voice switch may contain software for performing the necessary processing. If a connection is made with a smart communications device or a communications device having an associated computer interfaced through IP network 100, the corresponding router or smart communications device or associated computer may contain software for performing necessary processing. If the communications device is a computer communications device combination such as computer 111 and communications device 112 interfaced with a router and voice switch, then the voice switch and router, or smart communications device or associated computer, may contain software for performing this processing, depending upon whether the connection is made through the router and IP network 100, through voice switch 105 and another communications device interfaced with the voice switch, or a communications device interfaced with the voice switch through PSTN 102. In particular, the component interfacing the network to communicate with a communications device, or combination communications device and other component, may contain the software. Also, gatekeeper 115 may contain such software.

Variable Treatments for a Party on Hold

From the perspective of a communications device placed on hold during a communications session, an apparatus for receiving variable treatments for the communications device on hold may include the following elements. The apparatus maintains a connection between a first communications device and a second communications device and receives an indication that the first communications device is on hold. The apparatus provides treatment options for a treatment provided to the first communications device while on hold, receives an indication of a selected one of the treatments, and provides the selected treatment at the first communications device while the communications device is on hold, for example, the media connection was dropped or the packet stream was stopped.

From the perspective of communications device not on hold during a communications session in which another communications device is on hold, an apparatus for providing variable treatments for the communications device on hold may include the following elements. The apparatus maintains a connection between a first communications device and a second communications device and provides an indication that the first communications device is on hold. The apparatus provides treatment options for a treatment while the first communications device is on hold, receives an indication of a selected one of the treatments, and provides the selected treatment to the first communications device while the communications device is on hold or a media connection is dropped.

An apparatus associated with the communications device on hold or the communications device not on hold may include additional features, such as the following. The apparatus may provide treatment options of music, silence, multimedia, audio, or a connection with a voice mail system, and it may receive an indication of a selected new treatment while the first communications device is on hold and provide the selected new treatment while the communications device is on hold. Treatments including multimedia status information may be provided, for example, Automatic Call Distribution (ACD) information concerning a caller's time or position in a queue. Preselected options may be provided based upon, for example, the caller's identity. The first communications device may also be removed from on hold, possibly resuming a real-time connection.

Figure 3:
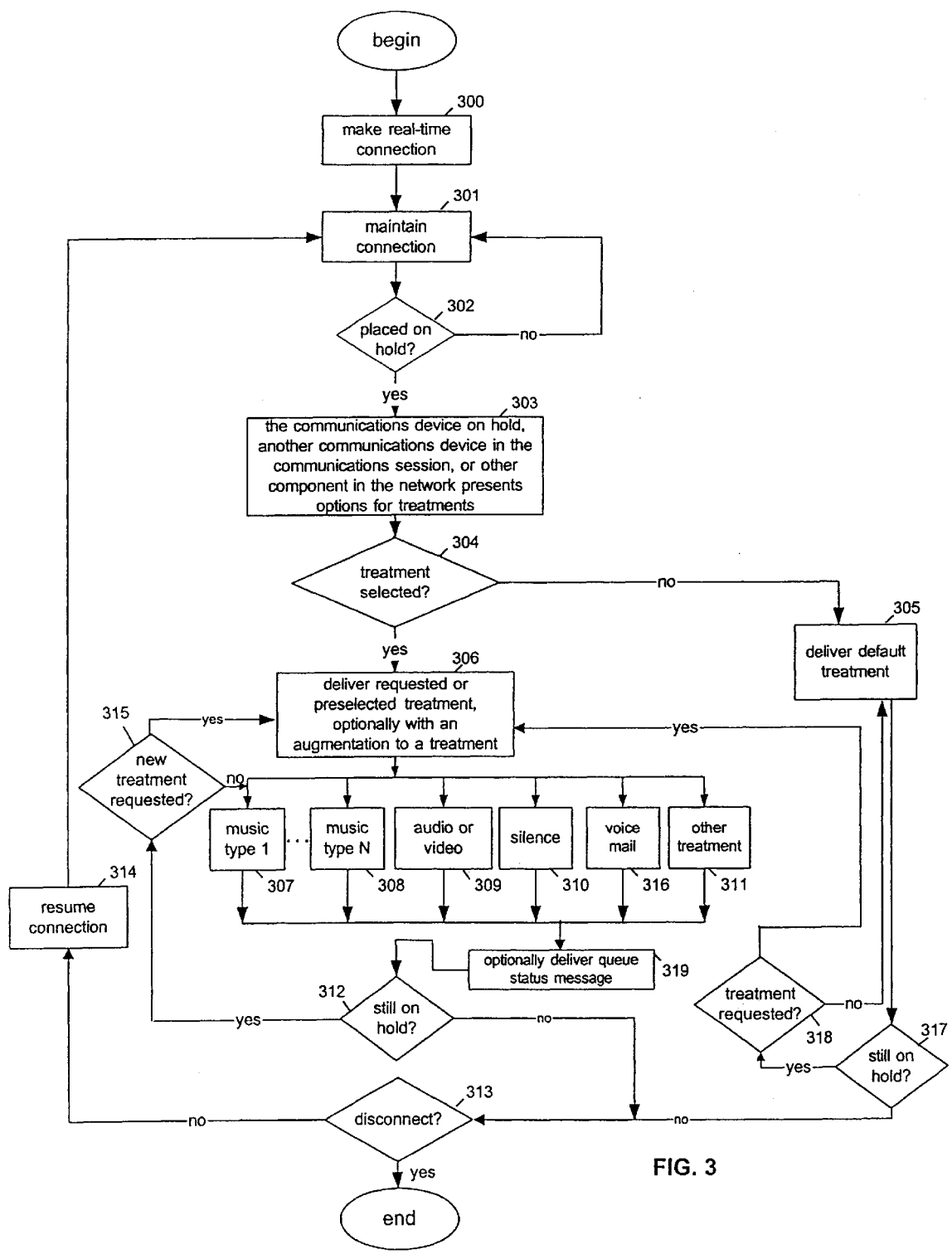
FIG. 3 is a flow chart of a process for providing treatments to a party placed on hold during a communications session.

FIG. 3 is a flow chart illustrating this process for providing user-selected treatments while placed on hold during a communications session. The term "user" may encompass a person or a machine. A party first establishes a real-time connection in a communications network (step 300) to engage in a typical real-time communications session. During the communications session, the communications devices and network maintain a connection (step 301). This connection may include the real-time connection, or it may include only a control path connection and not a bearer path (real-time) connection. The system determines if any of the parties have been placed on hold (step 302). If any particular party is on hold, the system presents options for treatments to the party on hold (step 303), typically by presenting audio information concerning the options. The options may be presented by the communications device for the party on hold, another communications device within the call, or the network. Thus, for example, the communications device for the party on hold may obtain and provide whatever information the party on hold requests.

The system then determines if the party on hold has entered a particular selection for a treatment while on hold or has preselected a hold treatment (step 304). For preselected treatments, a communications device may store an identification of treatment to be provided when on hold. If no treatment has been selected or preselected, it delivers a default treatment (step 305). Otherwise, the system delivers the requested or preselected treatment (step 306), optionally with augmented treatment explained below, and the communications device that presented the options may obtain and provide the selected treatment. In a network using packet-based transmission of information, when an on-hold message arrives, the system may stop sending media packets and instead send the media stream selected or preselected by the party on hold.

Options for treatments presented to a user on hold include, for example, a first type of music (step 307), other types of music (step 308), audio or video (step 309), silence or no audio treatment (step 310), a voice mail server (316), or another type of treatment (step 311) such as a treatment using a musical input digital interface (MIDI). The audio provided in step 309 may include any audio available via a network interfacing the communications device on hold such as, for example, a stock ticker, sports scores, or news. Systems exist for providing audio over a network, an example of which is the RealAudio product identified above. The option of silence may be useful if a conference of more than one party is on hold so that the parties on hold may continue their conversation or communications session. The option of allowing parties on hold to determine the type of music they will hear may increase the desirability of hearing music while on hold and thus expand the potential market for music providers.

The system then determines if the party on hold remains on hold (step 312). While the party remains on hold, the system preferably continues to deliver either the default treatment or the requested treatment, and if the party on hold requests a new treatment, the system delivers the new treatment (step 315). In particular, the communications device for the party on hold may provide an indication of a selected new treatment by, for example, receiving and providing a number or code corresponding to the new treatment, and the other communications device or communications devices within the call may receive that indication.

An augmentation to a treatment may also be provided to the communications device on hold to provide (step 319), for example, information to the party on hold while that party receives the selected or preselected treatment. For example, the calling party's connection may be in a queue waiting for a real-time connection, and the treatment may be augmented to indicate to the calling party the position of its connection in the queue and an expected time duration before the real-time connection will be made. For example, the communications device on hold may receive information stating it is the Mth caller on hold or will likely be serviced in N minutes. Therefore, treatments on hold may be provided by either the communications device on hold, the communications device not on hold, both communications devices, or their associated computers or switches or other components. Both communications devices may deliver treatments using stream splicing of the connection.

If the party is no longer on hold or if the system receives an off-hold packet, the system determines if there has been a disconnection (step 313). If the other party or parties to the communications session have maintained a connection, and the party on hold has not disconnected, the system resumes the connection for the party or parties that were on hold (step 314).

If the system delivered a default treatment, it may also determine if the party on hold remains on hold (step 317). If so, it typically determines if the party on hold entered an indication of a requested treatment (step 318) and, if so, it delivers the requested treatment in steps 306–311. Otherwise, it continues to deliver the default treatment (step 305).

With respect to FIG. 1A, the processing shown in FIG. 3 may occur between communications devices in PSTN 102, communications devices in IP network 100, or between a communications device in PSTN 102 and another in IP network 100. When the requested treatment on hold is delivered, the information such as the requested music need not be provided from the other parties in the communications session. For example, while a party is on hold, audio stream server 118 may provide the requested music through IP network 100. If another party's communications device does not provide the requested music, a different source may more efficiently and cost effectively provide it through IP network 100.

A system may accomplish this efficiency using statistical multiplexing of packet-based information. Statistical multiplexing of packets and different pricing schemes for transmitting packets over the Internet are known and are described in, for example, the MacKie-Mason & Varian document identified above. For example, the server providing the information may use spare packets in the transmission for providing the audio information. In addition, if the call interfaces with IP network 100, other types of information of potential use to the party on hold may be provided. For example, through IP network 100 a party on hold may hear information received over the Internet, including, as mentioned above, news or other audio information. In addition, the party on hold may elect to take advantage of this useful time to check their voice mail. In that case, a system interfaces the calling party's communications device with the corresponding voice mail server for that party.

The processing shown in FIG. 3 is typically implemented in software for controlling the corresponding communications devices. If the communications device is interfaced with PSTN 102, the corresponding voice switch may contain software for performing this processing. If the communications device is a smart communications device or a communications device having an associated computer interfaced through IP network 100, the corresponding router or smart communications device or associated computer may contain software for performing the processing. If the communications device is a computer communications device combination such as computer 111 and communications device 112 interfaced with a router and voice switch, then the voice switch and router, or smart communications device or associated computer, may contain software for performing this processing, depending upon whether the connection is made through the router and IP network 100, through voice switch 105 and another communications device interfaced with the voice switch, or a communications device interfaced with the voice switch through PSTN 102. In particular, the component interfacing the network to communicate with a communications device, or combination communications device and other component, may contain the software. Also, gatekeeper 115 may contain such software.

Variable Termination Treatments for a Calling Party

From the perspective of a calling party's communications device, an apparatus for the alling party's communications device to receive a response to an attempted communications session may include the following elements. The apparatus attempts to initiate a communications session from a calling party's communications device to a called party's communications device. It receives at the calling party's communications device a plurality of options for treatments if the attempted communications session was not completed. The apparatus receives an indication of a selected one of the treatments and provides the selected treatment at the calling party's communications device, optionally providing the treatment as explained above with respect to sending real-time information in communications networks or requesting the treatment from the calling party's or called party's communications device.

From the perspective of a called party's communications device, an apparatus for the called party's communications device to provide a response to an attempted communications session may include the following elements. The apparatus receives an attempt to initiate a communications session from a calling party's communications device to a called party's communications device. It provides at the calling party's communications device a plurality of options for treatments if the attempted communications session was not completed.

An apparatus associated with the calling party's or called party's communications device may include additional features, such as receiving an indication of a selected one of the treatments and optionally providing the selected treatment to the calling party's communications device. The apparatus may also provide options for treatments of receiving a recorded message, transferring to a voice mail system, transferring to a pager, transferring to an e-mail system, or initiating another communications session. In addition, treatments may be provided based upon default provisioned options, caller specific or selected options, or called party intervention to provide options.

Figure 4:
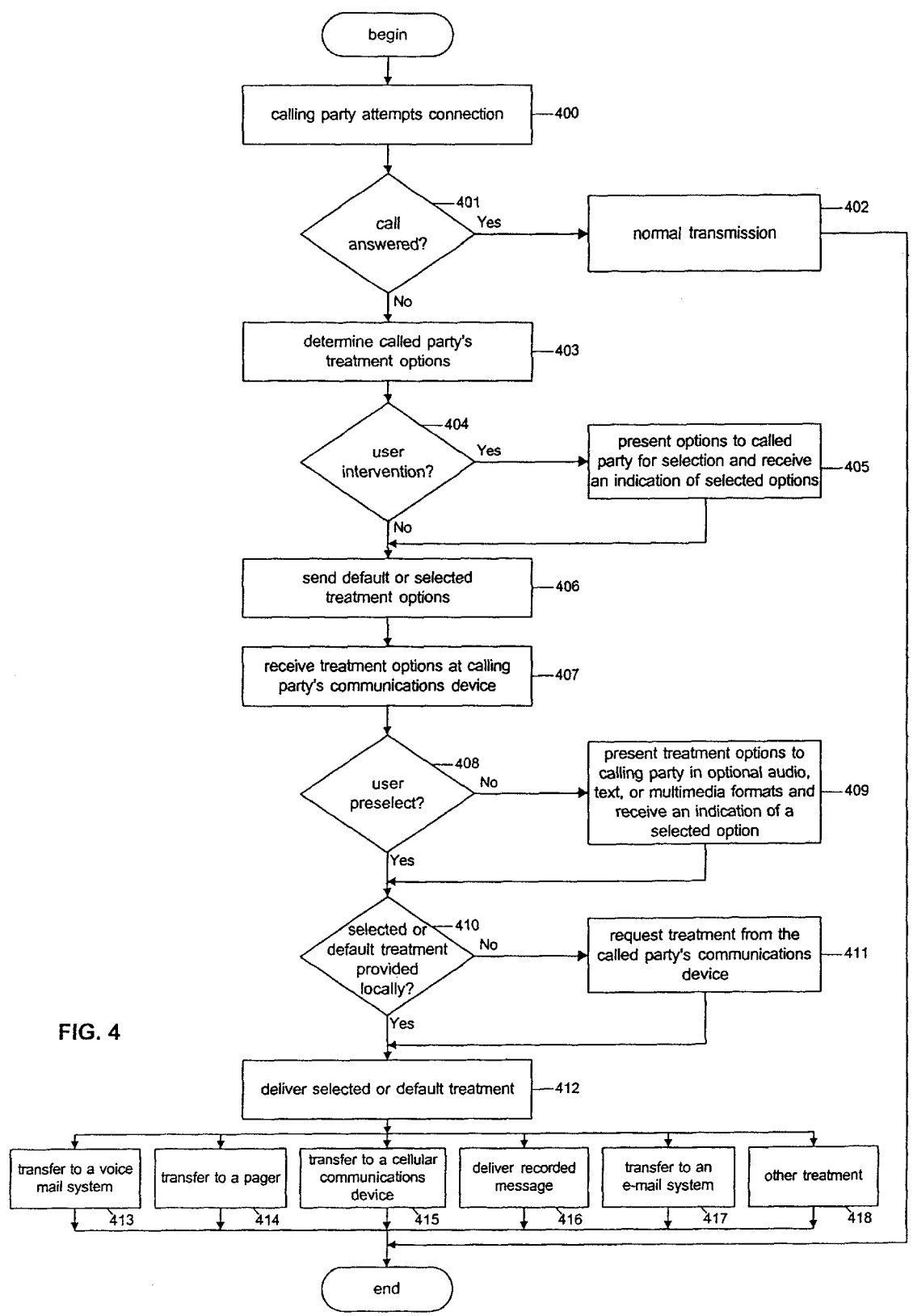
FIG. 4 is a flow chart of a process for providing call termination treatments to a calling party.

FIG. 4 is a flow chart illustrating this process for providing options for call termination treatments to a calling party. The calling party through a communications device attempts a communications session or connection with a called party (step 400), and the called party's communications device receives that attempt. If the call is answered (step 401), normal transmission occurs (step 402) involving a real-time communications session. Otherwise, the called party's communications device determines the called party's treatment options (step 403), which may include determining if there is user intervention by the called party, for example (step 404), in which case the called party's communications device presents options to the called party for selection and receives an indication of selected options in response (step 405).

The called party's communications device sends default or selected treatment options (step 406), depending upon whether options were selected through user intervention. Default options may be predefined by the called party's communications device, or by the called party or other person. The calling party's communications device receives the default or selected treatment options (step 407) and determines if the calling party selected or preselected options (step 408). If not, it presents treatment options to the calling party and receives an indication of a selected option in response (step 409). The calling party's communications device may present the options in optional audio, text, or multimedia formats. If the calling party selected no option, the calling party's communications device may send a default option.

The calling party's communications device determines if the calling party's selected option or the default option is available locally such as on the device or without requiring a network connection (step 410). If not, it requests the treatment from the called party's communications device (step 411), which delivers the selected or default treatment (step 412). Treatments include, for example, the following: transferring the calling party's connection to a voice mail system (step 413), transferring the calling party's connection to a pager (step 414), transferring the calling party's connection to a cellular or other communications device (step 415), delivering a recorded message (step 416), transferring the calling party's connection to an e-mail system (step 417), or providing another type of option (step 418).

Accordingly, when a calling party's communications device does not successfully complete a connection with a called party or other person, a calling party is provided options likely to increase the probability that the calling party will reach the called party or otherwise provide the called party with an indication of the priority of the communications session. For example, if the call is urgent, the calling party may elect to transfer to a pager or another communications device for the called party rather than leaving a voice mail message. Thus, high priority or value calls are possibly transferred to a more expensive service, such as a cellular communications session, potentially resulting in increased revenue for the service provider.

With respect to FIG. 1A, the processing shown in FIG. 4 may occur between communications devices in PSTN 102, between communications devices in IP network 100, or between a communications device in PSTN 102 and another in IP network 100.

The processing shown in FIG. 4 is typically implemented in software for controlling the corresponding communications devices. For example, if a communications device in PSTN 102 is involved in the connection, the corresponding voice switch may contain software for performing this processing. If a communications device interfaced with IP network 100, such as a smart communications devices or a communications device having an associated computer, is involved in the connection, the corresponding router or smart communications device or associated computer may contain software for performing this processing. If the communications device is a computer communications device combination such as computer 111 and communications device 112 interfaced with a router and voice switch, then the voice switch and router, or smart communications device or associated computer, may contain software for performing this processing depending, upon whether the connection is made through the router and IP network 100, through voice switch 105 and another communications device interfaced with the voice switch, or a communications device interfaced with the voice switch through PSTN 102. In particular, the component interfacing the network to communicate with a communications device, or combination communications device and other component, may contain the software. Also, gatekeeper 115 may contain such software.

Variable Treatments for a Distributed Communications System

From the perspective of a calling party's communications device, an apparatus for receiving treatments corresponding to the calling party's unsuccessful attempt to complete a communications session may include the following elements. The apparatus attempts to initiate a communications session from a calling party's communications device to a called party's communications device. The apparatus receives an indication that the attempted communications session was not completed and also receives at the calling party's communications device a message providing an indication of a treatment corresponding to the attempted communications session.

From the perspective of a called party's communications device, an apparatus for providing treatments corresponding to a calling party's unsuccessful attempt to complete a communications session may include the following elements. The apparatus receives an attempt to initiate a communications session from a calling party's communications device to a called party's communications device. The apparatus provides an indication that the attempted communications session was not completed and also provides to the calling party's communications device a message providing an indication of a treatment corresponding to the attempted communications session.

An apparatus associated with the calling party's or called party's communications device may include additional features, such as the following. It may receive or provide a cause value and an address of an associated message corresponding to the attempted communications session and also provide an address of the message in alternate languages. These messages may offer multiple media formats such as text, audio, or video. The message may be obtained from the calling party's communications device or from the network by using the address; alternatively, the treatment may be received or transmitted with the message. Varying versions of the message, such as a multimedia version, may be provided.

Figure 5:
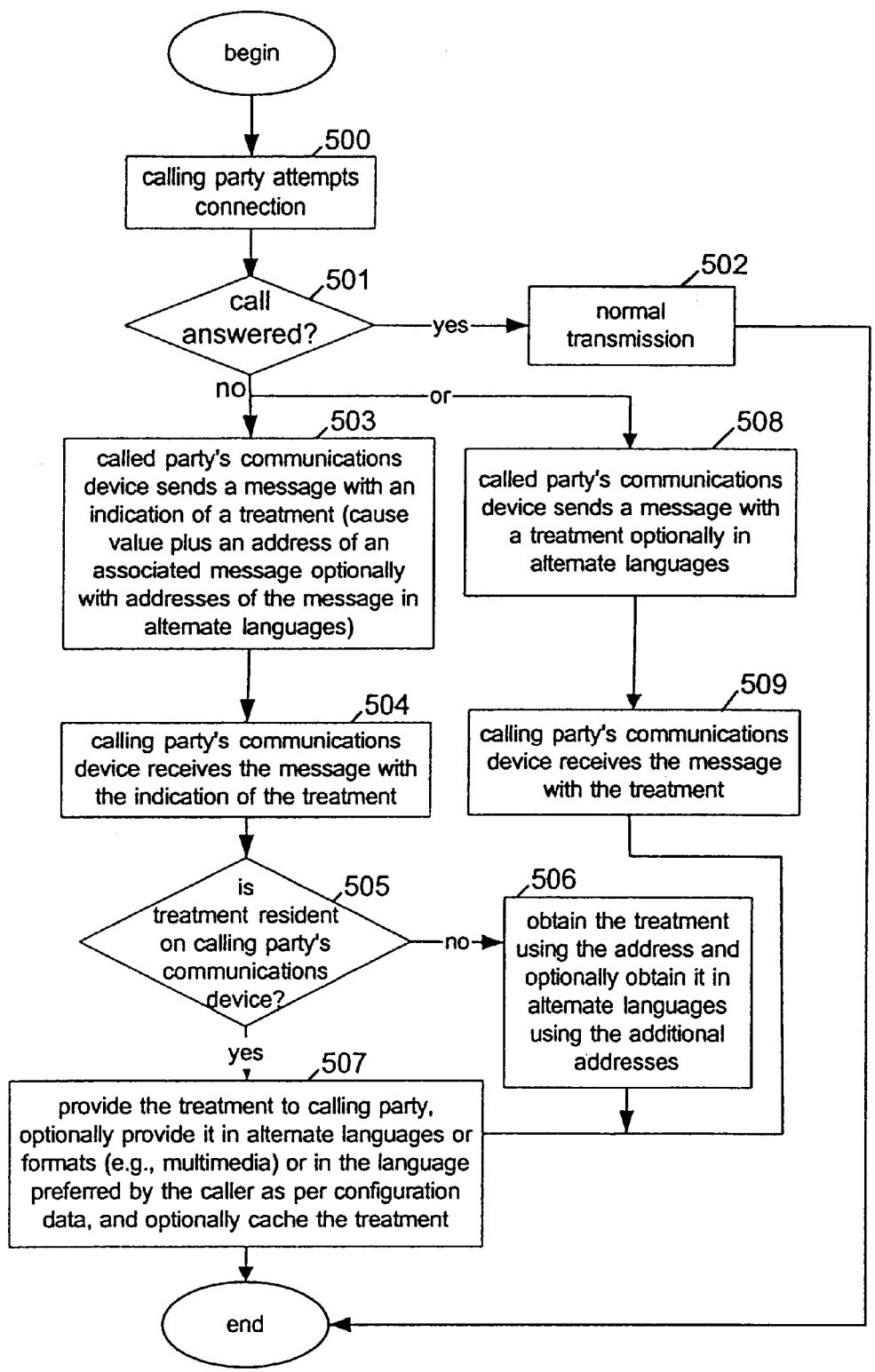
FIG. 5 is a flow chart of a process for providing treatments to calling parties in a distributed communications system.

FIG. 5 is a flow chart illustrating this process for providing treatments in a distributed communications system. A calling party attempts a communications session or connection with a called party (step 500). If the call is answered (step 501), normal transmission occurs (step 502) involving a real-time communications session. Otherwise, the called party's communications device may provide, and the calling party's communications device may receive, an indication that the attempted connection or communications session was not completed or was unanswered. The called party's communications device may send a message with an indication of a treatment including a cause value plus an address of an associated message concerning why the connection was not completed, such as a disconnected number. The treatment may optionally include addresses for the message in alternate languages (step 503) such as, for example, a URL identifying the available network locations and protocols of the treatment or message. This address may optionally include a version identifier to ensure use of a current version if a local cache is maintained. As mentioned above, communications devices may include associated computers, which may receive and process the messages.

The calling party's communications device receives the message with the indication of the treatment (step 504). It determines if the treatment is resident on the machine for the calling party (step 505) and, if the treatment is resident, the calling party's communications device provides that treatment to the calling party, optionally using the additional addresses to obtain and provide the treatment or message in alternate languages and formats (step 507). In addition, the varying versions of the treatment or message may be provided, such as a multimedia version. The user may subscribe to specific formats and languages for treatments; if so, the correct forms of the treatment are used. The system may use a URL to obtain the treatment (step 506) and provide it to the calling party, optionally using the additional addresses to obtain and provide the treatment or message in alternate languages.

Therefore, in a network using packet-based transmission of information, the system may transmit the treatments using packets of a reduced fee and need not, for example, maintain a network connection for a duration of the treatment or message delivery. This processing may thus save network time and cost. The calling party's communications device may also include a local cache for temporarily storing information associated with a cause value. The device may thus locally retrieve the information in response to a cause value and avoid having to again retrieve the information via the network. This local retrieval of information also saves network time and cost. It also eliminates the need for local maintenance of treatment messages. In addition, the cache may include a version or date with the information and discard it after a particular time period to help prevent, for example, using outdated information in response to a cause value.

The called party's communications device may optionally send a message with the treatment provided in alternate languages and formats (step 508). The calling party's communications device receives the message (step 509) and provides the treatment to the calling party, optionally providing it in alternate languages or formats (step 507).

The transmitted treatment typically includes an indication concerning why the call was not completed. In particular, the treatment may include a cause value. These cause values and the associated reasons are typically known within a particular communications network such that the various communications devices in the network know what reason corresponds to a transmitted cause value. Standard cause values and related information are described in the following documents, all of which are incorporated herein by reference:

International Telecommunication Union, Telecommunication Standardization Sector (ITU-T) Recommendation Q.931 bis: Digital Subscriber Signalling System No. 1 (ITU 1995); ITU-T Recommendation Q.931: Digital Subscriber Signalling System No. 1; Network Layer (ITU 1994); ITU-T Recommendation Q.932: Digital Subscriber Signalling System No. 1; Network Layer (ITU 1994).

The reasons associated with those standard cause values have limited information. Another standard cause value may be created, a generic cause value, indicating that more information is available for the treatment, and that information may be provided as explained above. For example, the treatment may include an address of an audio or visual message providing information concerning why the connection was not completed, the audio or visual message being accessible via the URL or other address. The treatment optionally includes URLs specifying locations and protocols of the message in alternate languages so that the calling party may hear the message in a particular language, which may be useful for attempted international communications sessions. Therefore, the calling party's communications device may use the URL to access the message through IP network 100 or PSTN 102. Accordingly, refinability of treatments may be achieved using information accessible via URLs identified by a standard cause value.

With respect to FIG. 1A, the processing shown in FIG. 5 may occur between communications devices in PSTN 102, between communications devices in IP network 100, or between a communications device in PSTN 102 and another in IP network 100.

The processing shown in FIG. 5 is typically implemented in software for controlling the corresponding communications devices. If the communications device is within PSTN 102, for example, the corresponding voice switch may contain software for performing this processing. If the communications device is a smart communications device or a communications device having an associated computer interfaced with IP network 100, the corresponding router or smart communications device or associated computer may contain software for performing this processing. If the communications device is a computer communications device combination such as computer 111 and communications device 112 interfaced with a router and voice switch, then the voice switch and router, or smart communications device or associated computer, may contain software for performing this processing, depending upon whether the connection is made through the router and IP network 100, through voice switch 105 and another communications device interfaced with the voice switch, or a communications device interfaced with the voice switch through PSTN 102. In particular, the component interfacing the network to communicate with a communications device, or combination communications device and other component, may contain the software. Also, gatekeeper 115 may contain such software.

Therefore, the router or voice switch, or smart communications device or associated computer, under software control may access the audio message through IP network 100 in order to obtain the audio message as part of the treatment. The address may also specify paths for alternate languages so that, upon request by the calling party, the software within a router or voice switch or other component may obtain the message in different languages as requested by the user.

Machines or other apparatus implementing functions described in the present specification may include computer processors for performing the functions. They may include modules or programs configured to cause the processors to perform the functions and optionally may include computer program products stored in a memory. The computer program products may include a computer-readable medium or media having computer-readable code embodied therein for causing the machines or other apparatus to perform the functions. The media may also include a computer data signal embodied in a carrier wave and representing sequences of instructions which, when executed by a processor, cause the processor to securely address a peripheral device at an absolute address by performing the method described in this specification. The media may also include data structures for use in performing the functions.

While the present invention has been described in connection with a preferred embodiment, many modifications will be readily apparent to those skilled in the art, and this application is intended to cover any adaptations or variations thereof. For example, various other components for the elements shown in FIG. 1A may be used without departing from the scope of the invention. This invention should be limited only by the claims and equivalents thereof.

What is claimed is:

1. A system for a calling party's communications device to receive from a called party's communications device a response including a plurality of treatment options to an attempted communications session, comprising:
   a calling party's communications device;
   a called party's communications device;
   a network for interfacing the calling party's communications device with the called party's communications device; and
   an apparatus interfaced with the calling party's communications device, the apparatus including:
      means for attempting to initiate a communications session from the calling party's communications device to the called party's communications device;
      receiving means for receiving at the calling party's communications device a plurality of options for treatments if the attempted communications session was not completed;
      means for interpreting at the calling party's communications device the plurality of options for treatments;
      means for receiving an indication of a selected one of the treatments; and
      means for providing at the calling party's communications device the selected treatment.

2. The system of claim 1 wherein the receiving means includes
   means for receiving options for treatments of
      receiving a recorded message,
      transferring to a voice mail system,
      transferring to a pager,
      transferring to an e-mail system, or
      initiating another communications session.

3. The system of claim 1 wherein the providing means includes
   means for providing a preselected treatment based upon information related to the calling party.

4. A system for a called party's communications device to provide to a calling party's communications device a response including a plurality of treatment options to an attempted communications session, comprising:
   a calling party's communications device;
   a called party's communications device;
   a network for interfacing the calling party's communications device, the apparatus including:
      means for receiving an attempt to initiate a communications session from the calling party's communications device to the called party's communications device; and
      providing means for providing at the calling party's communications device a plurality of options for treatments for the calling party's communications device a plurality of options for treatments for the calling party's communications device to interpret if the attempted communications session was not completed.

5. The system of claim 4, further including:
   means for receiving an indication of a selected one of the treatments; and
   means for providing at the calling party's communications device the selected treatment.

6. The system of claim 4 wherein the providing means includes
   means for providing options for treatments of
      providing a recorded message,
      transferring to a voice mail system,
      transferring to a pager,
      transferring to an e-mail system, or
      initiating another communications session.

7. The system of claim 4 wherein the providing means includes
   means for providing a preselected treatment based upon information related to the calling and called parties.

8. A system for receiving at a calling party's communications device a response including a plurality of treatment options from a called party's communication device to an attempted communications session, comprising:
   means for attempting to initiate a communications session from a calling party's communications device to a called party's communications device;
   receiving means for receiving at the calling party's communications device a plurality of options for treatments if the attempted communications session was not completed;
   means for interpreting at the calling party's communications device the plurality of options for treatments;
   means for receiving an indication of a selected one of the treatments; and
   means for providing at the calling party's communications device the selected treatment.

9. The apparatus of claim 8 wherein the receiving means includes
   means for receiving options for treatments of
      receiving a recorded message,
      transferring to a voice mail system,
      transferring to a pager, or
      initiating another communications session.

10. The apparatus of claim 8 wherein the providing means includes
    means for providing a preselected treatment based upon information related to the calling party.

11. A system for a called party's communications device to provide to a calling party's communications device a response including a plurality of treatment options to an attempted communications session, comprising:
    means for receiving an attempt to initiate a communications session from a calling party's communications device to a called party's communications device; and
    providing means for providing at the calling party's communications device a plurality of options for treatments for the calling party's communications device to interpret if the attempted communications session was not completed.

12. The apparatus of claim 11, further including:
    means for receiving an indication of a selected one of the treatments; and
    means for providing at the calling party's communications device the selected treatment.

13. The apparatus of claim 12 wherein the providing means includes
    means for providing options for treatments of
       providing a recorded message,
       transferring to a voice mail system,
       transferring to a pager,
       transferring to an e-mail system, or
       initiating another communications session.

14. The apparatus of claim 12 wherein the providing means includes means for providing a preselected treatment based upon information related to the calling and called parties.

15. A method for a calling party's communications device to receive from a called party's communications device a response including a plurality of treatment options to an attempted communications session, comprising the steps of:

attempting to initiate a communications session from a calling party's communications device to a called party's communications device;

receiving at the calling party's communications device a plurality of options for treatments if the attempted communications session was not completed;

interpreting at the calling party's communications device the plurality of options for treatments;

receiving an indications of a selected one of the treatments; and providing at the calling party's communications device the selected treatment.

16. The method of claim 15 wherein the first receiving step includes the step of receiving options for treatments of
receiving a recorded message,
transferring to a voice mail system,
transferring to a pager,
transferring to an e-mail system, or
initiating another communications session.

17. The method of claim 15 wherein the providing step includes the step of providing a preselected treatment based upon information related to the calling party.

18. A method for a called party's communications device to provide to a calling party's communications device a response including a plurality of treatment options to an attempted communications session, comprising the steps of:

receiving an attempt to initiate a communications session from a calling party's communications device to a called party's communications device; and providing at the calling party's communications device a plurality of options for treatments for the calling party's communications device to interpret if the attempted communications session was not completed.

19. The method of claim 18, further including:

receiving an indication of a selected one of the treatments; and providing at the calling party's communications device the selected treatment.

20. The method of claim 19 wherein the first providing step includes the step of providing options for treatments of
providing a recorded message,
transferring to a voice mail system,
transferring to a pager,
transferring to an e-mail system, or
initiating another communications session.

21. The method of claim 19 wherein the providing step includes the step of providing a preselected treatment based upon information related to the calling and called parties.

22. A computer program product, comprising:

a computer-readable medium containing instructions for controlling a computer system to perform a method, the method including:

attempting to initiate a communications session from a calling party's communications device to a called party's communications device;

receiving at the calling party's communications device a plurality of options for treatments from the called party's communications device if the attempted communications session was not completed;

interpreting at the calling party's communications device the plurality of options for treatments;

receiving an indication of a selected one of the treatments; and providing at the calling party's communications device the selected treatment.

23. The computer program product of claim 22 wherein the first receiving step includes the step of receiving options for treatments of
receiving a recorded message,
transferring to a voice mail system,
transferring to a pager,
transferring to an e-mail system, or
initiating another communications session.

24. The computer program product of claim 22 wherein the providing step includes the step of providing a preselected treatment based upon information related to the calling party.

25. A computer program product, comprising:

a computer-readable medium containing instructions for controlling a computer system to perform a method, the method including:

receiving an attempt to initiate a communications session from a calling party's communications device to a called party's communications device; and providing at the calling party's communications device a plurality of options for treatments from the called party's communications device for the calling party's communications device to interpret if the attempted communications session was not completed.

26. The computer program product of claim 25, further including:

receiving an indication of a selected one of the treatments; and providing at the calling party's communications device the selected treatment.

27. The computer program product of claim 26 wherein the first providing step includes the step of providing options for treatments of
providing a recorded message,
transferring to a voice mail system,
transferring to a pager,
transferring to an e-mail system, or
initiating another communications session.

28. The computer program product of claim 26 wherein the providing step includes the step of providing a preselected treatment based upon information related to the calling and called parties.

* * * * *